2 Sheets—Sheet 1.
H. F. GRAETZEL.
Check-Row Corn Planter and Fertilizer.
No. 224,176. Patented Feb. 3, 1880.
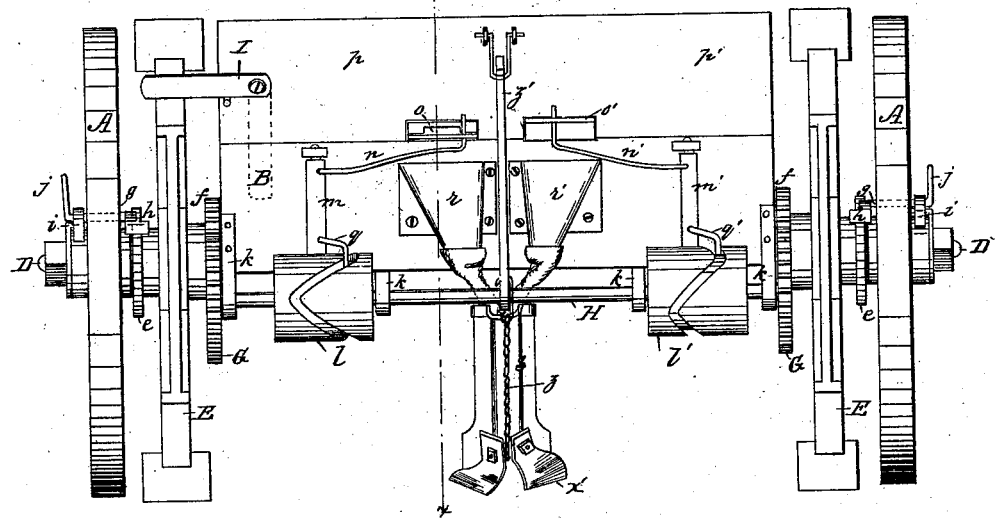
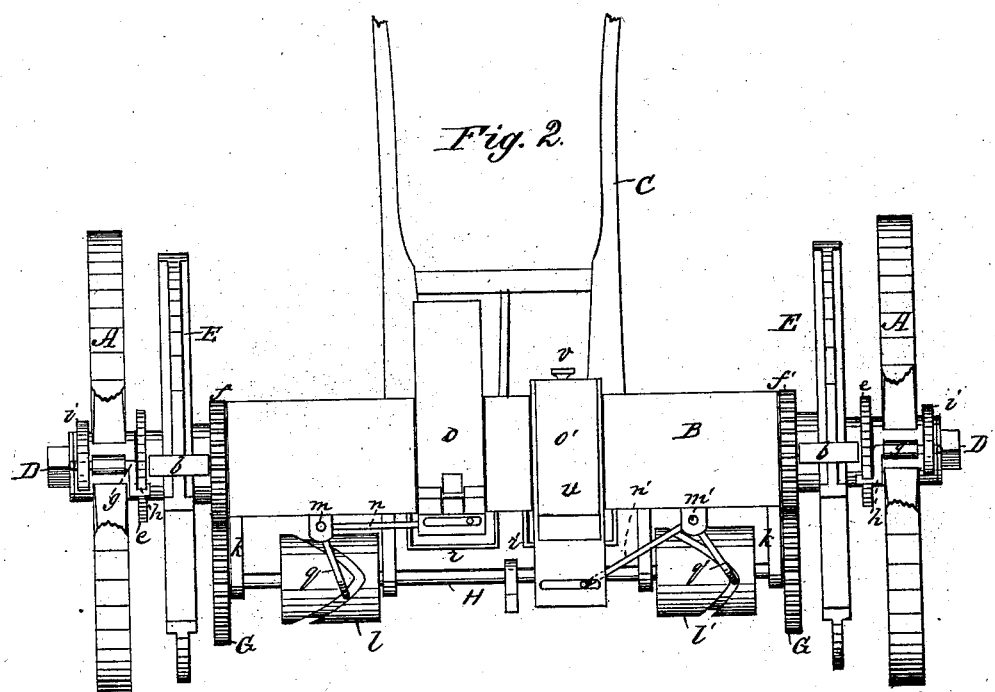
WITNESSES:
W. W. Hollingsworth
Edw. W. Byrn.
INVENTOR:
H. F. Graetzel
BY
ATTORNEYS.

H. F. GRAETZEL.
Check-Row Corn Planter and Fertilizer.
No. 224,176. Patented Feb. 3, 1880.
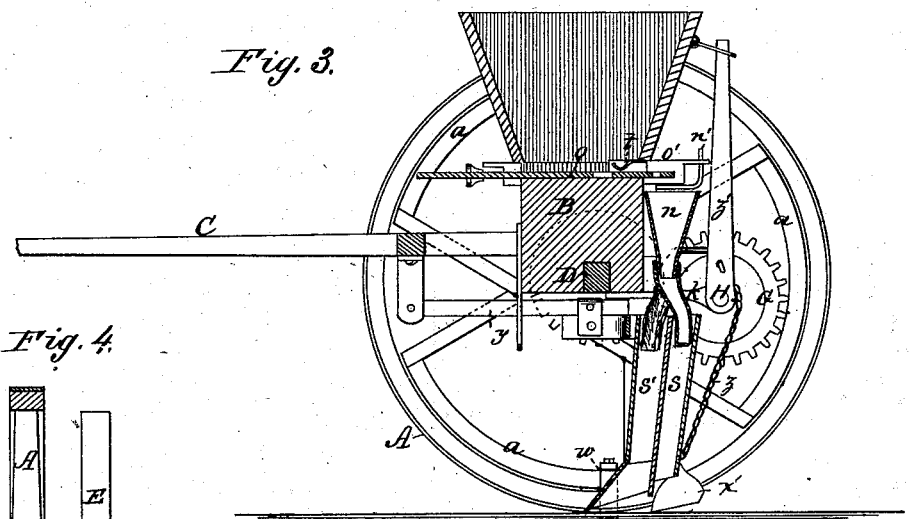
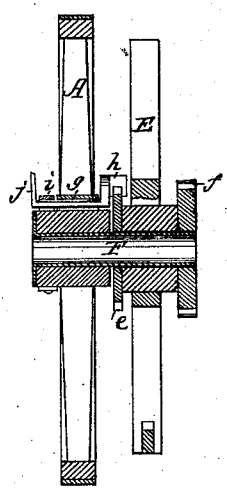
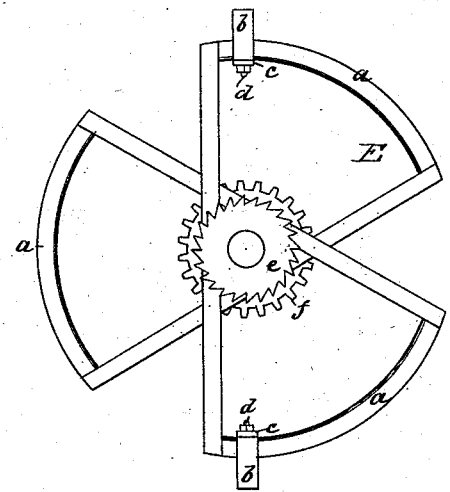

UNITED STATES PATENT OFFICE.

HENRY F. GRAETZEL, OF ST. JOSEPH, MARYLAND.

CHECK-ROW CORN-PLANTER AND FERTILIZER.

SPECIFICATION forming part of Letters Patent No. 224,176, dated February 3, 1880.

Application filed October 10, 1879.

*To all whom it may concern:*

Be it known that I, HENRY F. GRAETZEL, of St. Joseph, in the county of Baltimore and State of Maryland, have invented a new and Improved Check-Row Corn-Planter and Fertilizer; and I do hereby declare that the following is a full, clear, and exact description of the same, reference being had to the accompanying drawings, forming part of this specification, in which—

Figure 1 is a rear elevation. Fig. 2 is a plan view, with the seed and fertilizer boxes removed and the wheels broken away to show clutch device. Fig. 3 is a vertical transverse section through line $x \, x$ of Fig. 1. Fig. 4 is a sectional detail, showing connection of running-wheel and marker; Fig. 5, a side view of one of the markers.

My invention is designed to provide an improved device for planting corn in perfect check-row, so that the rows shall be straight each way, and at the same time distributing a limited amount of fertilizer to each hill as it is planted.

The check-row devices are of that general form in which feet or markers are caused, by the revolution of the running-wheels, to make an impression in the soft earth, which may be observed in going across the field the next time, and with which preceding marks the markers are made to register again.

The fertilizing devices are of that general character in which a slide provided with means for adjusting its capacity is operated simultaneously with the seed-slide, and causes a limited amount of the fertilizer to be dropped with the corn into a spout and be covered by the same operation.

The improvements comprise the following features: first, the peculiar structure and adjustment of the markers; secondly, the peculiar construction and arrangement of parts, whereby the motion of the running-wheels is made to act through the markers and drive the seeding and fertilizing devices, as hereinafter fully described.

In the drawings, A A represent the running-wheels; B, the body of the planter, and C the shafts. The wheels A are mounted upon the ends of the axle D, which runs through the lower portion of the body of the planter. Between the wheels and the body of the planter are arranged the markers E, which consist of three segments, (see Fig. 5,) connected to a central hub and having arc-shaped bars $a$ at their outer sides, corresponding to the curve of the running-wheels. These arc-shaped bars are provided with feet $b$, which, by indenting the ground, make an impression that serves as a guide for the dropping of the next row. As the relative position of these markers may at times be required to be changed, I connect them adjustably to the arc-shaped bars by clamp-plates $c$ and bolts $d$, so that they may be fastened to the segments at any desired place on their curved surfaces. These markers bear each upon the outer side of their hubs a ratchet-wheel, $e$, and upon the inner side have gear-wheels $f$. The ratchet-wheels $e$ connect with the driving-wheels and impart their motion to the markers, while the gear-wheels $f$ transmit the motion to the seeding and fertilizing device.

In connecting the running-wheels B with the markers I arrange in bearings on the hub of the wheels B short rock-shafts $g$, Figs. 1, 2, and 4, whose inner ends bear a hooked pawl-arm, $h$, that engages with the ratchet-teeth of the marker when the wheel is rotated in a forward direction, and rides over the teeth when the machine is backed.

Upon the outer end of the rock-shaft $g$ there bears a spring, $i$, which tends always to hold the pawl engaged with the ratchet, while a crank-arm, $j$, serves as a handle whereby the pawl may be thrown out of gear with the ratchet when the machine is to be transported from the field or turned round at the end of the row. The spring $i$ is so arranged in relation to the rock-shaft that when the pawl is thrown out of engagement with the ratchet the said spring serves to hold or lock the pawl in its disengaged position.

In the transmission of the motion of the running-wheels B to the marker it is very necessary that the pawl should always engage properly with the ratchets of the marker, and if they were journaled independently on the axle their individual play might allow them to deviate from a parallel plane, which would disengage connection between the pawl and ratchet. To counteract this difficulty there is rigidly attached to the hub of the running-wheels an inwardly-projecting sleeve, F, (see Fig. 4,) upon which the hub of the marker is journaled, and by which the running-wheels and markers are kept always in the same parallel plane.

The devices for dropping the corn and fertilizer will now be described.

In the rear of the body of the planter is arranged a transverse shaft, H, journaled in bearings in rearwardly-projecting supports $k$, attached to the ends and bottom of the body of the planter. This shaft carries, at each end, a gear-wheel, G, which engages with and receives motion from the inner wheels, $f$, of the markers. This shaft H is provided, for each row of hills, with two hubs, $l\ l'$, having cam-grooves in them, in which oscillate the rearwardly-projecting arms $q\ q'$ of vertical rock-shafts $m\ m'$. These rock-shafts are held in bearings at the rear side of the body of the planter, and their upper arms, $n\ n'$, enter slots in the feed-slides $o\ o'$, which control the discharge of seed and fertilizer from their respective hoppers $p\ p'$. Of these two sets of mechanism, $l$, $q$, $m$, $n$, and $o$ control the seeding of the corn, while $l'$, $q'$, $m'$, $n'$, and $o'$ control the dropping of the fertilizer.

In the seed-slide $o$ for the corn there is the customary space for the reception of the few grains of corn which are to be dropped, and which space is pulled through the side of the hopper and the corn allowed to drop into the hopper $r$, leading by a flexible tube to the spout $s$. To prevent the corn from becoming packed in the slide, the hopper is made with an expanding opening, through which the slide passes, by causing a spring, $t$, Fig. 3, to form one side of said opening. This rides over the projecting grain without mashing or jamming them. The other slide, $o'$, has a space to receive the fertilizer, and in order to graduate the amount to the requirement of the soil this space may be adjusted by a slide, $u$, and set-screw $v$. This same provision may also be used for the seed-slide. As the fertilizer is discharged from the slide it drops into the hopper $r'$ and passes through a flexible tube into the spout $s'$. The spouts $s$ and $s'$ are connected together, with the grain-spout $s$ in the rear and the fertilizer-spout in advance. These spouts are provided with a foot or opener, $w$, in front, and coverers $x'$ behind, and are carried by a jointed drag-bar, $y$, in front, while a chain and lever, $z\ z'$, serve to raise or lower the spouts, the lever $z'$ being jointed or fulcrumed at its end upon the rear horizontal shaft, and folding up to connection with a hook in the rear of the hoppers whenever the spouts are to be raised for transportation.

I is a latch, attached to the rear of the hoppers, and adapted to be thrown outwardly into range of the markers whenever the latter are detached from the main wheels, so that the markers cannot revolve with the main wheels from friction, and thus actuate the seeding devices when they should be thrown out.

For timing the action of the slides the grooved hubs are made adjustable on the shaft, the hubs being held to any adjustment by a set-screw.

As shown, the device is constructed in its simplest form, adapted to plant only one row of corn; but in practice I prefer to construct it so as to plant as many rows as desired.

Having thus described my invention, what I claim as new is—

1. A marker for a check-row corn-planter, consisting of segments of a circle having upon their curved bars marking-feet, made adjustable over the arc of the said bars, substantially as described.

2. The combination of the main wheels A, the connected markers E, having gear-wheels $f$, the shaft H, having gear-wheel G, engaging with the wheels $f$ and carrying the hubs $l\ l$, with cam-grooves, the rock-shafts $m\ m'$, with arms $q\ q'$ and $n\ n'$, and feed-slides $o\ o'$, together with the discharge hoppers and spouts, all arranged substantially as described.

HENRY F. GRAETZEL.

Witnesses:
GEORGE T. DIETZ,
AUGUST J. WIRSING.